United States Patent [19]

Fredriksson et al.

[11] 4,039,806
[45] Aug. 2, 1977

[54] SYNTHESIZER FOR TESTING ELEMENTS OF A GEOPHYSICAL DATA ACQUISITION SYSTEM

[75] Inventors: Oke A. Fredriksson; Elmer L. Thomas, both of Fullerton, Calif.

[73] Assignee: Chevron Research Company, San Francisco, Calif.

[21] Appl. No.: 618,550

[22] Filed: Oct. 1, 1975

[51] Int. Cl.² .......................................... H03K 13/02
[52] U.S. Cl. ..................................... 235/152; 328/14; 340/347 AD
[58] Field of Search .......................... 235/152; 328/14; 340/347 AD

[56] References Cited

U.S. PATENT DOCUMENTS

| 3,657,657 | 4/1972 | Jefferson | 328/14 |
| 3,735,269 | 5/1973 | Jackson | 328/14 |
| 3,763,364 | 10/1973 | Deutsch et al. | 235/152 |
| 3,877,023 | 4/1975 | Spicer et al. | 340/347 DA |

OTHER PUBLICATIONS

*Analog–Digital Conversion Handbook* by Analog Devices, Inc., June 1972 pp. II-79 & III-82–III-83.
H. Rossero "Analog Switch with Gating Spike Suppression" *IBM Tech. Discl. Bulletin* vol. 14, No. 9, Feb. 1972, pp. 2825–2826.

*Primary Examiner*—David H. Malzahn
*Attorney, Agent, or Firm*—R. L. Freeland, Jr.; H. D. Messner

[57] ABSTRACT

This disclosure relates to a non-recursive digital synthesizer for producing a surprisingly accurate synthesized sinusoid suitable for testing elements of a geophysical data acquisition system in either a laboratory or a field environment. In accordance with the present invention, [(C/2)+1]-discrete—16-bit binary words are stored in a read-only memory (ROM), representing discrete amplitudes of a digitized sinusoid in a frequency range of 1–500 Hz, and then accessed in succession to a digital-to-analog converter (DAC). A separate suppression circuit means at the output of the DAC is adapted to operate in synchronization with movement of the binary words through the DAC; in that way, glitches generated by the various digital elements of the synthesizer are suppressed. Result: accuracy of the generated sinusoid to the elements under test is assured.

3 Claims, 6 Drawing Figures

SYNTHESIZER FOR TESTING ELEMENTS OF A GEOPHYSICAL DATA ACQUISITION SYSTEM

RELATED APPLICATIONS INCORPORATED HEREIN BY REFERENCE

"Automatic Measurement and Display of Resonance Frequencies of Seismic Detection Elements", O. A. Fredricksson and E. L. Thomas, Ser. No. 618,606, filed Oct. 1, 1975, and "Automatic Method and Apparatus for Digitally Indicating Response Characteristics of Geophones of a Geophysical Data Acquisition System", O. A. Fredriksson and E. L. Thomas, Ser. No. 618,602, filed Oct. 1, 1975.

SCOPE OF THE INVENTION

This invention is directed to a digital synthesizer, and more particularly to a non-recursive digital synthesizer suitable for testing seismic equipment.

The term "non-recursive" is used to indicate a synthesizer which accesses discrete, quantized samples of a digitized sinusoid from a memory, usually a read-only memory (ROM), to a digital-to-analog converter (DAC), where D/A conversion of the binary samples occurs. The result is a synthesized sinusoid at the output of the DAC.

BACKGROUND OF THE INVENTION

In seismic exploration in remote and urban areas of the world, acoustic waves are generated at or near the surface and sent downward into the earth. Reflections occur at the interface of the subsurface strata whose acoustic impedances differ, and are subsequently detected by groups of geophones positioned at the earth's surface. Each geophone group (which can comprise a number of individual geophones) produces a composite electrical signal, such signal driving equipment usually located in a recording truck adjacent to the geophones.

Field seismic equipment must be tested. For this purpose, a sinewave generator is often used to drive elements of the field systems in a selected manner. The response of the equipment is a measure of its field worthiness. However, for field testing, such generators should be light-weight, small and portable, and generate a highly accurate sinusoid using preferably a battery power source. No such generator is presently available which meets all of the above-listed requirements.

OBJECT OF THE INVENTION

An object of the present invention is the provision of a light-weight, portable, non-recursive digital synthesizer suitable for use in testing elements or subelements of a geophysical data acquisition system in either a field or laboratory environment.

SUMMARY OF THE INVENTION

In accordance with the present invention, a non-recursive synthesizer is disclosed for generating a surprisingly accurate synthesized sinusoid in a range of 1–500 Hz. It includes a variable-frequency voltage-controlled oscillator (VCO). The oscillator produces a pulse train at a selected rate. The rate is proportional to the frequency, $f_o$, of the synthesized output, say in accordance with $Cf_o$ where C is a constant, say like 360. Connected to the output of the VCO is an up-down counter: the latter produces a series of 8-bit addresses in response to the $Cf_o$ pulse train. The counter, in turn, connects to a two-stage read-only memory (ROM). The ROM contains $[(C/2) + 1]$-discrete — 16-bit binary code words representing discrete amplitudes of the synthesized sinusoid to be generated. These code words are accessed — on command — to a digital-to-analog converter (DAC). Operation of the DAC is synchronized with a separate suppression circuit. The latter is positioned at the output of the DAC: as movement of the binary words through the DAC occurs, the suppression circuit cooperatively suppresses glitches generated by the various digital elements of the synthesizer. Result: accuracy of the sinusoid generated at the output of the DAC over a frequency range of 1–500 Hz, (necessary for testing elements of a geophysical data acquisition system), is assured.

In accordance with one aspect of the present invention, the $Cf_o$ pulse train is a product of either a digital oscillator of fixed frequency or a voltage-controlled oscillator (VCO) capable of fixed or swept operations.

In accordance with another aspect of the invention, the ROM contains two stages of memory cells, each of which is provided with 181-discrete — 8-bit binary half words. Each tandem cell is simultaneously enabled to access in succession to the DAC, the 16-bit binary word from which discrete sinusoid amplitude values are generated. Note that each binary word from the ROM has a bit length twice that of the half words individually stored in each cell. Result: the corresponding large word quantization and accurate bit discretization contained in the binary word code provides, after analog-to-digital conversion, the generation of a highly accurate and stable sinusoid over the output of the frequency range of interest.

Preferably, the synthesized sinusoid is in the form of discrete quantized "word" steps that are the product of the repetition rate of the $Cf_o$ pulse train. If C is made equal to 360, each discrete "step" of the generated sinusoid corresponds to one electrical degree for advantageous control and measuring purposes. When the input frequency, $Cf_o$, increases, the output frequency $f_o$ also increases. The system thus is capable of frequency modulation.

Further features, objects and advantages of the present invention become more apparent to those skilled in the art from a detailed reading of the following description of preferred embodiments thereof, when taken in consideration with the accompanying drawings.

DESCRIPTION OF PREFERRED EMBODIMENTS

Figure 1:
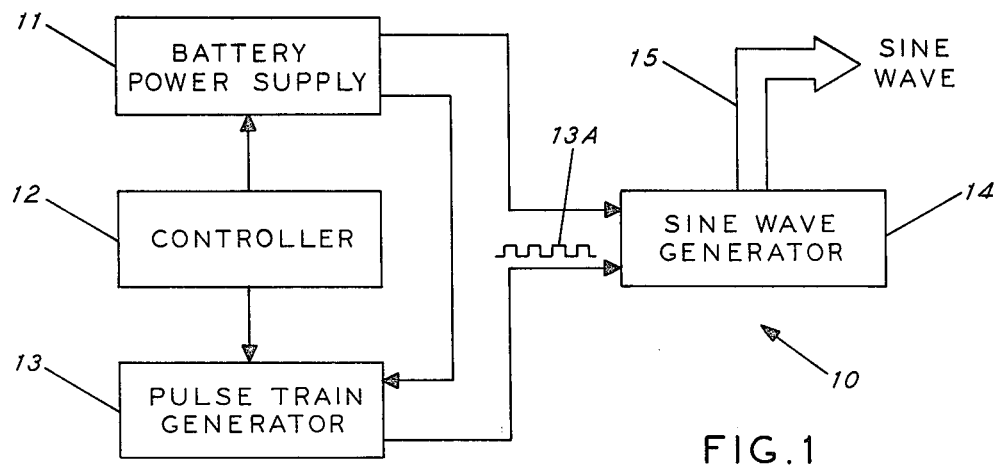
FIGS. 1 and 2 are block diagrams of the non-recursive digital synthesizer of the present invention.

Reference should now be had to the drawings, particulary FIG. 1, illustrating a non-recursive systhesizer 10 of the present invention.

Synthesizer 10 is preferably formed of large-scale integrated circuits (LSI's). The synthesizer is seen in FIG. 1 to be powered by a battery power source 11 where output is under control of controller 12. Controller 12 includes switching circuits manually controlled by a field operator to initiate operations in a conventional manner. Briefly, the controller 12 provides enabling signals to the various elements of the synthesizer by establishing continuity between such elements and the battery power supply 11.

Before the operation of the synthesizer 10 of the present invention is described in detail, a discussion of the generation of synthesized sinusoids from a mathematical viewpoint is believed to be in order and is presented below.

Let $X(t)$ represent a continuous sinusoid of frequency $f_o$. Then, $$X(t) = A \sin 2\pi f_o t = A \sin \frac{2\pi t}{T} \quad (1)$$

where $f_o$ is frequency and T is the period. When (1) is expressed discretely, it becomes $X(n)$:

$$X(n) = A \sin \frac{2\pi n}{360} \quad (2)$$

Of course, $X(n)$ is the value of the function throughout the nth interval; in the case of interest each $n$ interval is preferably made one degree long.

Figure 3:
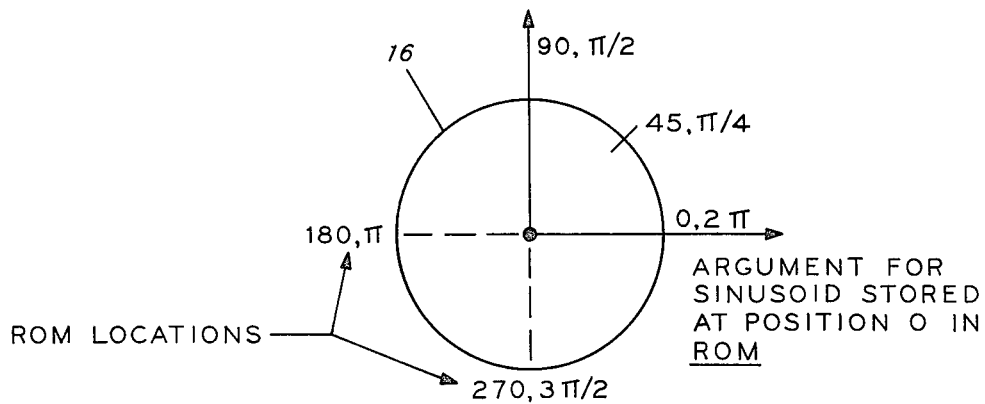
FIG. 3 illustrates addressing operations for various phase values useful in illustrating operations of the digital synthesizer of FIGS. 1 and 2.

Each separate arc of phase circle 16 of FIG. 3 defines a selected sinusoid argument. The argument is generated as a function of discrete time interval, T/360. However, its exact digital representation, say as set forth in equation (2), is also a function of storage available within the sine wave generator 14 of FIG. 2.

Figure 2:
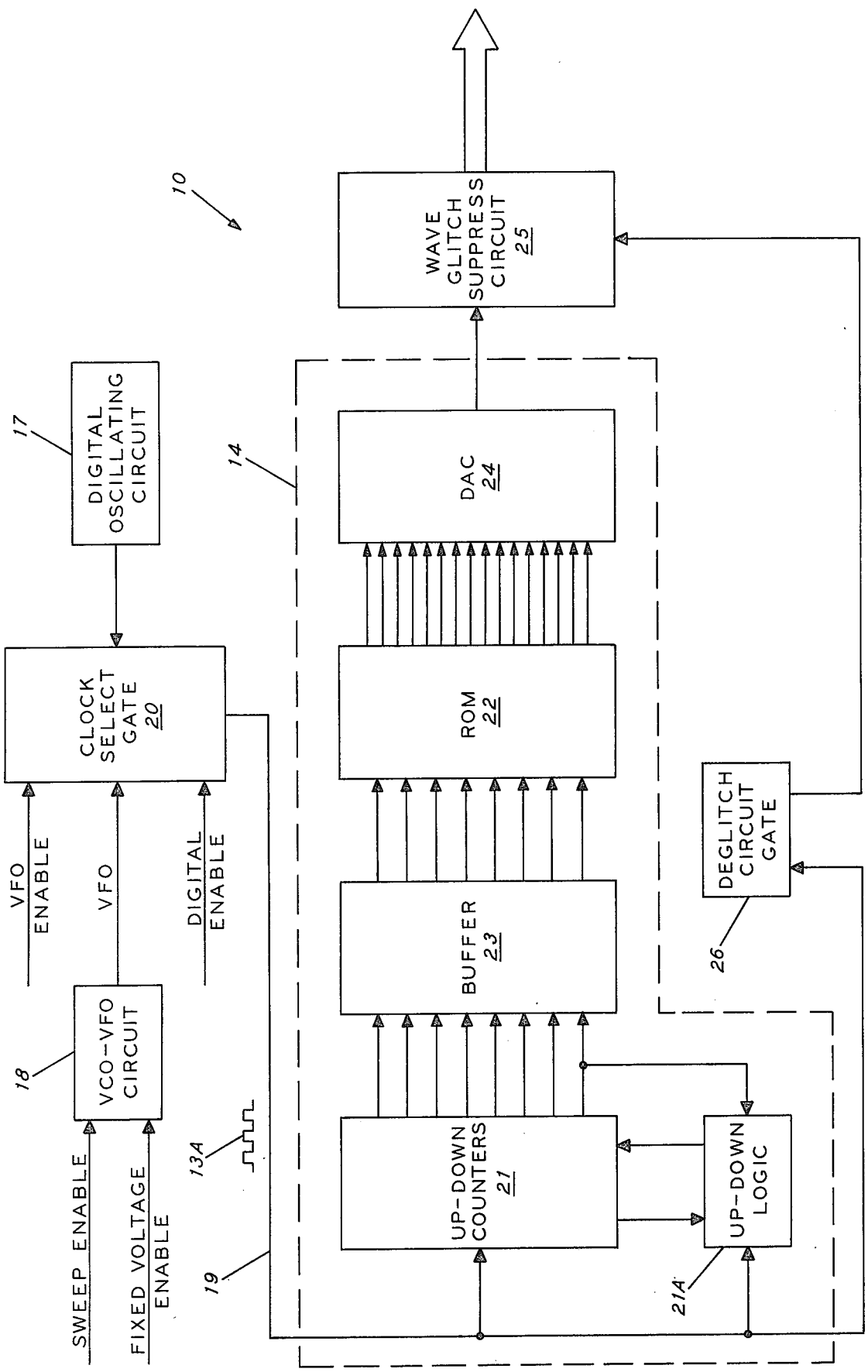

FIG. 2 illustrates operation of the non-recursive digital synthesizer 10 of the present invention in detail.

Briefly, synthesizer 10 is capable of producing a highly accurate synthesized sinusoid; the sinusoid is a product of first accessing and then converting rather long binary words using circuit elements which consume relatively small amounts of power. The resulting sinusoid is useful, especially in testing elements or subelements of a geophysical data aquisition system in a field environment. The testing occurs over a frequency range of 1-500 Hz.

Now, in more detail in FIG. 2, synthesizer 10 is seen to include a digital oscillator (DO) 17 in shunt with and separate from a voltage controlled oscillator 18 (VCO). DO 17 provides fixed-frequency operations; and can comprise a crystal oscillator in series with a plurality of dividers to provide several pulse trains of discrete repetition rates; alternatively, VCO 18 provides an output whose frequency is either fixed or can be made to vary as a function of time. Together these elements comprise multi-mode oscillator 13 of FIG. 1. At the common output 19 of DO 17 or VCO 18 in FIG. 2, the generated pulse train 13A is a reflection of either fixed, variable-, or swept-frequency operations, as discussed in more detail below, except that at any one instant the rate of pulse train 13A is equal to $Cf_o$ where C is a constant, preferably 360, and $f_o$ is the frequency of the sinusoid 15 to be generated.

At the output of the DC 17 and the VCO 18 is gate 20. The pulse train 13A is gated through clock select gate 20 as a function of control signals generated by controller 12 of FIG. 1. At the output of gate 20 is sinusoid generator 14.

Sine wave generator 14 includes up-down counters 21. Counters 21 are controlled by up-down logic circuit 21A. Purpose: to provide the desired series of 8-bit interrogation addresses for a two-stage read-only memory 22 (ROM). ROM 22 is seen to be connected to the output of the up-down counters 21 through buffer amplifiers 23.

In response to addresses generated by the counters 21, the ROM 22 provides a series of $[(C/2) + 1]$-discrete, 16-bit binary words: each word represents a discrete amplitude or argument of the sinusoid to be generated as a function of time. The words are accessed in sequence to DAC 24. Connected at the output of DAC 24 is suppression circuit 25; it is controlled by one-slot deglitch circuit 26. The purpose of the circuits 25 and 26, as explained below, is to reduce adverse effects of "glitches" caused by changes of state of DAC 24 and other elements of the systhesizer 10. As a result, the synthesized sinusoid 15 exiting from the circuit 25 is essentially free of signal spikes. Such condition is desirable if the sinusoid output is used in testing seismic equipment in the aforementioned frequency range of 1-500 Hz.

Figure 4A:
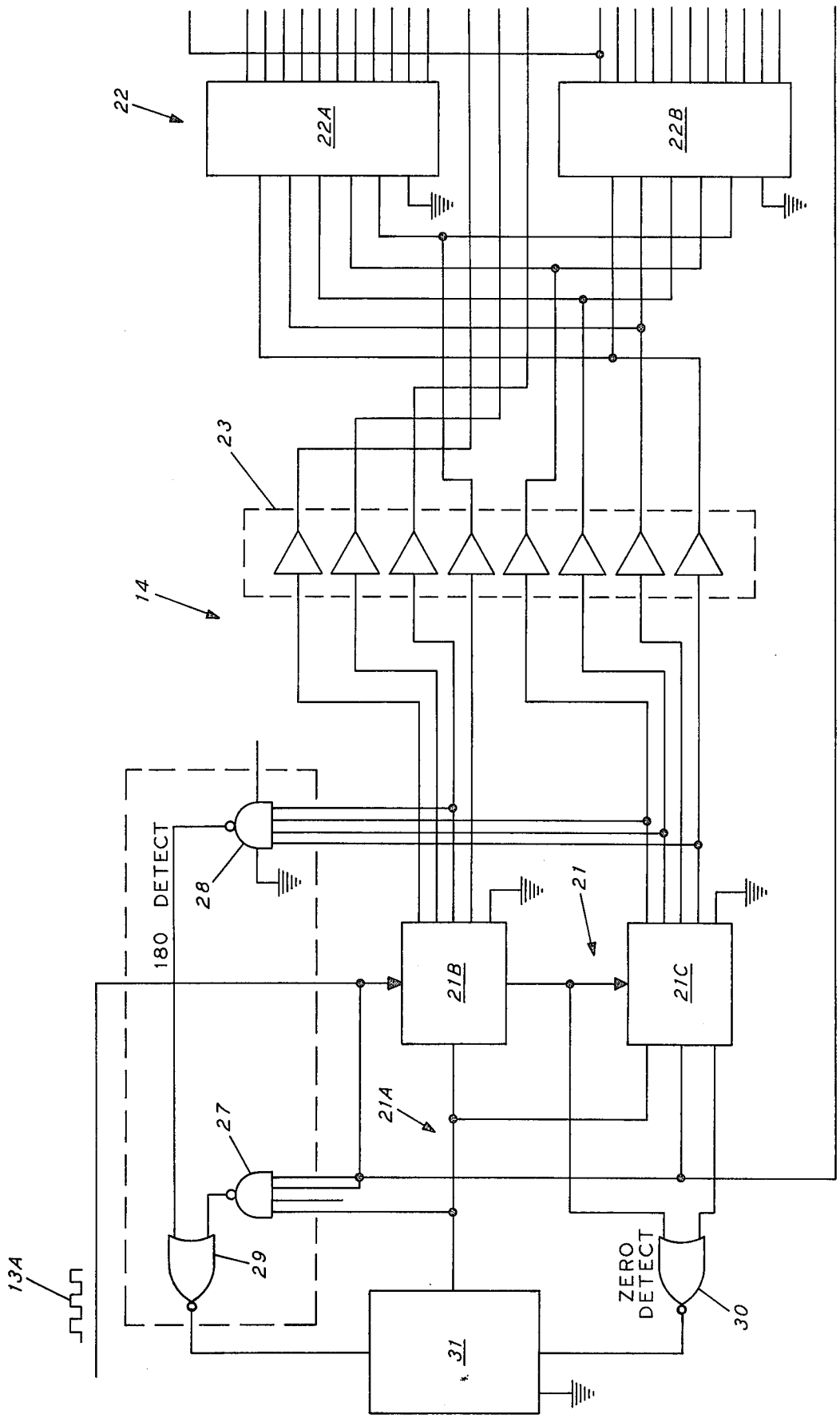
FIGS. 4A and 4B are block diagrams of various unit elements illustrating construction details.
Figure 4B:
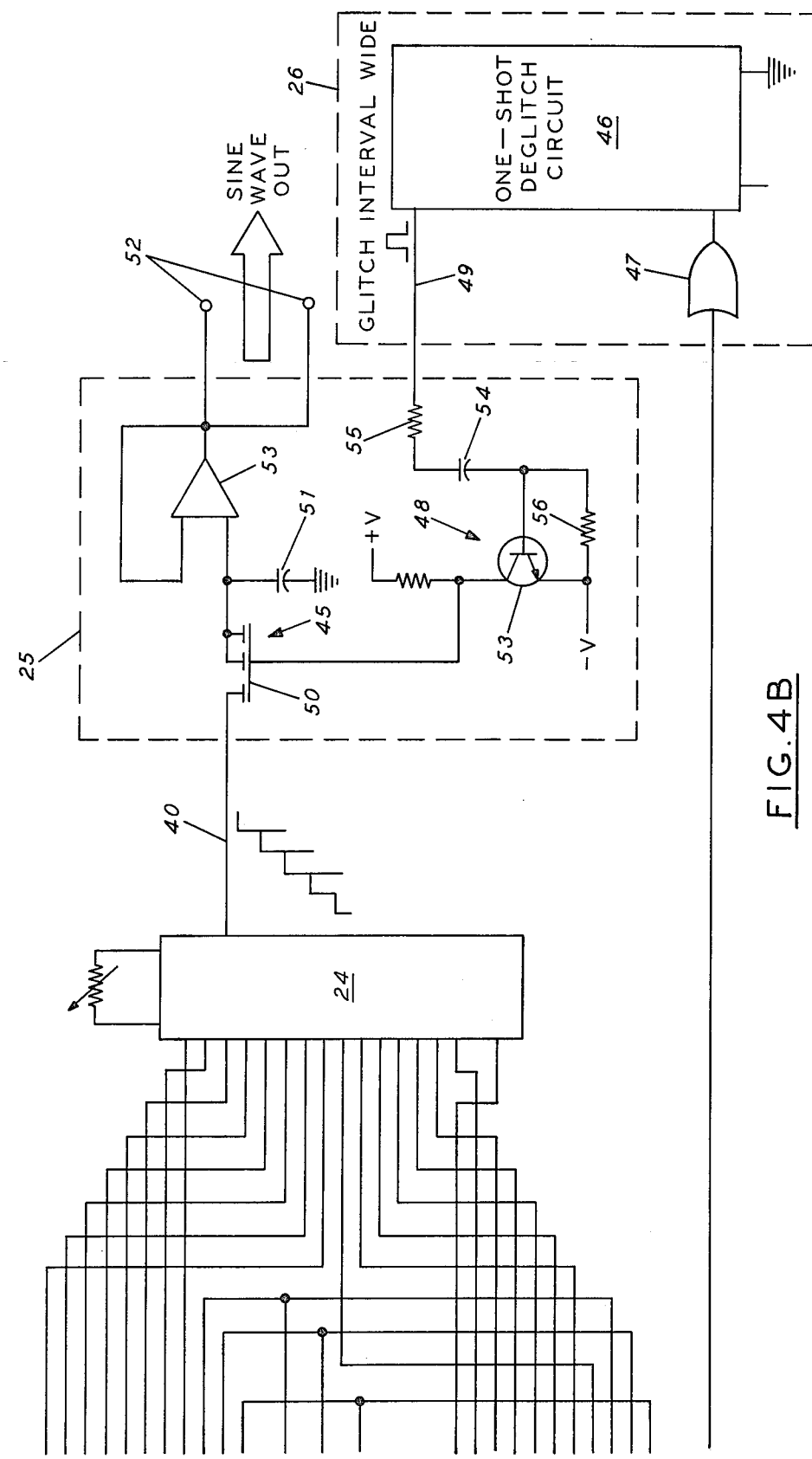

FIGS. 4 and 4B illustrate sine wave generator 14 as well as suppression circuit 25 in detail.

In FIG. 4A, up-down counters 21 are seen to be cascaded; each represented by a separate designation 21B or 21C. Control of the counters 21B and 21C is through logic control circuit 21A, as previously mentioned.

In FIG. 4A note that logic control circuit 21A includes NAND gates 27 and 28, NOR gates 29 and 30, and flip-flop 31. NOR gates 29 and 30 are used to control flip-flop 31: on the up-side of the counting cycle, a series of addresses is generated paced by the pulse train 13A. These addresses are capable of enabling, in full, memory cells 22a and 22b of ROM 22. As a result, a series of binary words is accessed from ROM 22 to DAC 24 in sufficient quantities to define two adjacent quadrants of the sinusoid to be generated. For example, in the up cycle, a two-quadrant code defined by phase angles between $\theta = +90°$ and $\theta = -90°$ generates discrete amplitude samples over two successive quadrants; similarly, during the down-counting sequence, phase angles in a range of $\theta = -90°$ to $\theta = +90°$ are similarly defined. That is, the down-side cycle is initiated through the resetting of flip-flop 31 via gates 27, 28 and 29. It ends when circuit 21A through NOR gate 30 senses the zero address in counter 21. That zero address activates the carry function of the counters 21. Thereafter, NOR gate 30 sets flip-flop 31 so that the up-counting cycle can begin anew.

As is well known, only one quadrant of the sinusoid to be generated is unique. However, the ROM 22 includes two quadrants' functional values associated with programmable submemory units 22A and 22B. Addresses from counters 21 enable cells of each unit 22A and 22B in tandem. Each unit 22A and 22B comprises a series of storage cells. The cells are capable of providing $[(C/2) + 1]$ binary words. Together the cells provide binary words having twice the bit length of the address words provided by the counters 21. Each of the addresses provided by counters 21 is 8 bits in length: then the binary code words accessed from ROM 22 are 16 bits in length. Of course, as previously mentioned, addressing of memory units 22A and 22B is controlled by the up-down counters 21. During each up- or down-counting cycle, both units 22A and 22B are simultaneously accessed to provide the longer word lengths that generate, after conversion, amplitude samples of the sinusoid over two successive quadrants. Since the

[(C/2) + 1]-discrete — 16-bit binary words stored in ROM 22 are accessed as a function of the pulse train rate $Cf_o$, it is obvious that a change in pulse train rate changes the frequency of the generated sinusoid. The words represent discrete amplitude samples of the sinusoid to be generated.

Tables I and II set forth the relationship between 8-bit addresses generated by up-down counters 21 and the resulting 16-bit binary full words code accessed from ROM 22 to DAC 24.

TABLE I

| 8-Bit addresses by Counters 20 Up-Counting | |
|---|---|
| Sequence | Binary Address |
| 0 | 00000000 |
| 1 | 00000001 |
| 2 | 00000010 |
| 180 | 10110100 |

TABLE II

| | ROM-16-Bit Sine Table Memory Program | | | | |
|---|---|---|---|---|---|
| Phase | Subunit 22a $2^0$ | Subunit 22b $2^{15}$ | Phase | Subunit 22a $2^0$ | Subunit 22b $2^{15}$ |
| +90 | 0 000 000 0 | 00 000 001 | −10 | 1 001 011 0 | 00 111 010 |
| 89 | 0 000 000 0 | 900 000 110 | −11 | 1 001 100 0 | 01 101 000 |
| 88 | 0 000 000 0 | 00 010 101 | −12 | 1 001 101 0 | 10 011 101 |
| 80 | 0 000 000 1 | 11 110 011 | −20 | 1 010 101 1 | 11 000 111 |
| 79 | 0 000 001 0 | 01 011 011 | −21 | 1 010 110 1 | 11 011 111 |
| 78 | 0 000 001 0 | 11 001 101 | −22 | 1 010 111 1 | 11 110 011 |
| 70 | 0 000 011 1 | 10 111 001 | −30 | 1 100 000 0 | 00 000 000 |
| 69 | 0 000 100 0 | 10 000 001 | −31 | 1 100 000 1 | 11 101 100 |
| 68 | 0 000 100 1 | 01 010 011 | −32 | 1 100 001 1 | 11 010 100 |
| 60 | 0 001 000 1 | 00 100 111 | −40 | 1 101 001 0 | 01 000 110 |
| 59 | 0 001 001 0 | 01 001 001 | −41 | 1 101 001 1 | 11 111 001 |
| 58 | 0 001 001 1 | 01 110 100 | −42 | 1 101 010 1 | 10 100 101 |
| 50 | 0 001 110 1 | 11 110 011 | −50 | 1 110 001 0 | 00 001 101 |
| 49 | 0 001 111 1 | 01 100 110 | −51 | 1 110 001 1 | 01 111 001 |
| 48 | 0 010 000 0 | 11 100 001 | −52 | 1 110 010 0 | 11 011 101 |
| 40 | 0 010 110 1 | 10 111 010 | −60 | 1 110 111 0 | 11 011 001 |
| 39 | 0 010 111 1 | 01 110 011 | −61 | 1 110 111 1 | 11 110 011 |
| 38 | 0 011 000 1 | 00 110 011 | −62 | 1 111 000 1 | 00 000 100 |
| 30 | 0 100 000 0 | 00 000 001 | −70 | 1 111 100 0 | 01 000 111 |
| 29 | 0 100 000 1 | 11 110 010 | −71 | 1 111 100 1 | 00 000 110 |
| 28 | 0 100 001 1 | 11 101 001 | −72 | 1 111 100 1 | 10 111 011 |
| 20 | 0 101 010 0 | 00 111 001 | −80 | 1 111 111 0 | 00 001 101 |
| 19 | 0 101 011 0 | 01 010 100 | −81 | 1 111 111 0 | 01 101 100 |
| 18 | 0 101 100 0 | 01 110 010 | −82 | 1 111 111 0 | 11 000 000 |
| 10 | 0 110 100 1 | 11 000 110 | −88 | 1 111 111 1 | 11 101 011 |
| 9 | 0 110 101 1 | 11 111 010 | −89 | 1 111 111 1 | 11 111 010 |
| 8 | 0 110 111 0 | 00 110 000 | −90 | 1 111 111 1 | 11 111 111 |
| +1 | 0 111 110 1 | 11 000 100 | | | |
| 0 | 1 000 000 0 | 00 000 000 | | | |
| −1 | 1 000 001 0 | 00 111 100 | | | |

The binary addresses produced by the up or down counting sequence of counters 21 are set forth at the right-hand column of Table I. Note there are 181 separate binary addresses (2°... 2⁷) generated by the counters 21. E. G., the zero addresses (00000000) are separated from the 181st position address (10110100) by 179 other addresses.

Table II illustrates the 16-bit binary word code accessed in sequence from ROM 22 during either an up- or down-counting sequence. In the up-counting cycle, for phase angles $\theta = +90$ to $\theta = -90$, note that the first discrete 16-bit binary word of the "up" code begins at 00000000 00000001, and the last binary word generated is 11111111 11111111.

Since each binary word shown in Table II has a word length of 16 bits, the accuracy for the underlying peak-to-peak analog amplitude is about 1 part in 65,000. Hence, the sinusoid generated from DAC 24 after processing of each binary word from ROM 22, as illustrated in Table II, has a high degree of accuracy. Ample accuacy, in fact, is provided for testing of seismic equipment in the field over the frequency range of interest.

FIG. 4B shows DAC 24 in more detail.

As shown, DAC 24 includes a single output 40 of an operational amplifier (not shown). Voltage at 40 is developed within DAC 24: it is representative of a quantized analog value equal to a 16-bit binary word accessed from ROM 22. The binary words stored within the ROM 22 are of course fixed. However, amplitude control of the resulting analog values at the DAC 24 can be provided.

FIG. 4B also illustrates suppression circuit 25 in more detail.

Purpose of circuit 25: to suppress high-frequency transients produced by the synthesizer which appear as extraneous unwanted signal spikes ("glitches") The spikes can be positive or negative; they can be generated by a change in state of elements within the synthesizer 10, e.g., such transients can be generated merely from changes in state within DAC 24, say as each binary word (from ROM 22) is converted to a discrete analog value. If the glitches or transients are not suppressed, they appear as "signals" and are converted to analog equivalents at output terminals 52.

As shown, suppression circuit 25 includes FET switch circuit 45. Circuit 45 is controlled through the circuit 26 previously mentioned. Circuit 26 preferably includes one-shot flip-flop 46 activated by the pulse train 13A at the output of oscillator 13 of FIG. 1 through OR gate 47. Hence, its operation is coordinated with and in synchronization to movement of 16-bit binary words through the DAC 24.

In operation, pulses pass relative to the one-shot circuit 26 in synchronization with pulse train 13A generated by DO 17 or VCO 18 of FIG. 2 because OR gate 47 gates that pulse train to deglitch flip-flop 46. From deglitch flip-flop 46, the pulses which can be about the width of a glitch, pass to the input of amplifier control circuit 48 and thence to FET switch circuit 45. Operation of amplifier control circuit 48 is straightforward. It includes transistor amplifier 53, whose base member is selectively enabled to operate through capacitor 54 and resistors 55 and 56 connected to circuit 26. Note that since both DAC 24 and circuit 26 are paced by the same pulse train 13A, synchronization of operations between the FET circuit 45 and the DAC 24 is assured.

Note also that FET switch circuit 45 includes a sample-and-hold capacitor 51. Capacitor 51 shunts the output terminal of FET 50. Purpose of the capacitor 51: to retain the voltage level of the preceding DAC output during that time that the FET switch 50 is open. Moreover, if switch 50 is open during the change in state of the DAC 24, i.e., say during the transient period that glitches occur from change in operating state, then the voltage across capacitor 51 retains that previous level free from changes due to transients.

Figure 5:
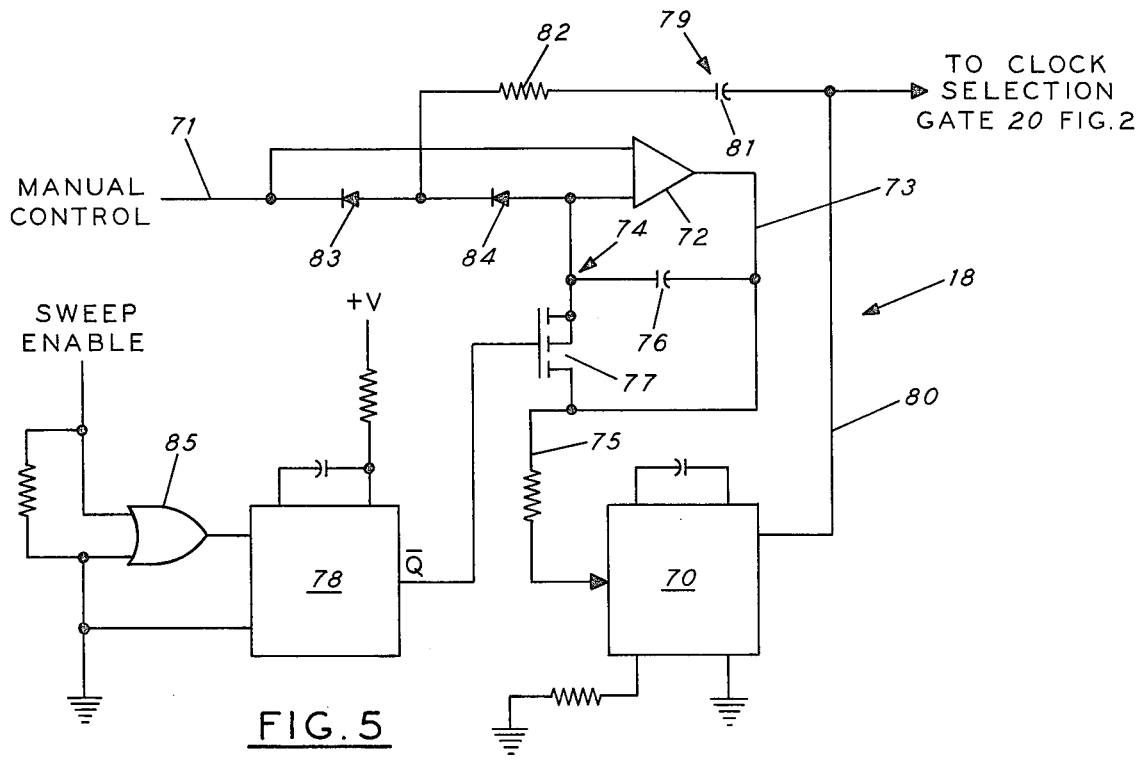
FIG. 5 illustrates oscillator operations in either swept- or fixed-frequency modes.

FIG. 5 illustrates aspects of the synthesizer 10 of the present invention which allow its use in a field environment.

In FIG. 5, VCO circuit 18 of FIG. 2 is shown in more detail.

As shown, circuit 18 is seen to have the capacity for changing the pulse train rate generated by VCO 70 in either a linear or swept manner. As shown, an operational amplifier 72 is used primarily to determine the frequency of VCO 70. Output 73 of the operational amplifier 72 is connected in circuit with input 75 of VCO 70 as well as directly through capacitor 76 in shunt with FET switch 77 controlled by one-shot 78 to feedback loop 74 input of operational amplifier 72. FET switch 77 is closed during fixed frequency operations of VCO 70: thus, the magnitude of the output voltage of operational amplifier 72 directly dictates the frequency output of VCO 70 during such operation.

When the FET switch 77 is opened through flip-flop 78, swept operations are initiated. Then a second loop 79 of operational amplifier 72, traceable through output leg 80 of VCO 70 and the negative input leg of the operational amplifier 72, becomes of primary importance. It includes capacitor 81 in series with the input legs of operational amplifier 72 through resistor 82 and diode switches 83 and 84.

Assume that the one-shot 78 has been triggered, say via controller 12 of FIG. 1, so that a signal enables OR gate 85. Assume also that a voltage signal (and frequency output at VCO 70) has already been established by the level of the manual signal at input leg 71 of the operational amplifier 72. The enabled state of the flip-flop 78 activates FET switch 77. The latter opens: capacitor 76 begins to charge, increasing the output voltage level of the operational amplifier 72, which is reflected at output 80 of VCO 70. Capacitor 81, a differentiating element, at the output of VCO 70 in combination with the resistor 82 provides negative current spikes at the negative input leg of operational amplifier 72 to appropriately drive operational amplifier 72 to higher output levels. As a result, the frequency of the pulse train generated by VCO 70 changes exponentially until the FET switch 77 is closed.

While specific embodiments of the invention have been described in detail, it should be understood that the invention is not limited thereto, as many variations will be readily apparent to those skilled in the art, and thus the invention is to be given the broadest possible interpretation within the terms of the following claims.

What is claimed is:

1. A synthesizer used in testing elements of a geophysical data acquisition system using a generated synthesized sinusoid of frequency $f_o$ where $f_o$ is in a range of 1 to 500 Hz, comprising:

means for producing a pulse train having a rate equal to $Cf_o$ where C is a constant;

counter means operative in response to said pulse train for producing a series of addresses;

storage means connected to said counter means, having storage locations operative in response to said addresses to produce a series of binary code words, each indicative of a digital amplitude of said sinusoid as a function of time;

digital-to-analog conversion (DAC) means connected to said storage means and having an output conductor path, for producing discrete analog amplitude values of said sinusoid thereat corresponding to said binary code words accessed from said storage means; and glitch suppression means connected to said conductor path of said DAC means operative to hold said discrete analog amplitude values at individual true values at least during a selected time interval measured by a change in operating state of said conductor path whereby unwanted glitches produced by change in operational state of at least said DAC means are suppressed;

said suppression circuit including a one-shot enabled by said $Cf_o$ pulse train, and switch circuit means responsive to said enabled one-shot to selectively disable and then enable said conductor path from said DAC means during said selected time interval.

2. The synthesizer of claim 1 in which said switch circuit means includes a multistate switch in series with a sample-and-hold capacitor and said DAC means, said switch circuit means disabling said path for said selected time interval, said selected time interval being of sufficient length so that glitches occasioned by change in state of said DAC means decay to acceptable levels before said path is again enabled.

3. The synthesizer of claim 2 in which charge of said sample-and-hold capacitor remains essentially constant during said selected time interval.

* * * * *